(12) United States Patent
Garnier et al.

(10) Patent No.: US 9,130,391 B2
(45) Date of Patent: Sep. 8, 2015

(54) CHARGE BALANCING SYSTEM FOR BATTERIES

(75) Inventors: Laurent Garnier, Marennes (FR); Daniel Chatroux, Teche (FR); Matthieu Desbois-Renaudin, Villard de Lans (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 222 days.

(21) Appl. No.: 14/003,865

(22) PCT Filed: Mar. 7, 2012

(86) PCT No.: PCT/EP2012/053880
§ 371 (c)(1),
(2), (4) Date: Oct. 24, 2013

(87) PCT Pub. No.: WO2012/120030
PCT Pub. Date: Sep. 13, 2012

(65) Prior Publication Data
US 2014/0035531 A1    Feb. 6, 2014

(30) Foreign Application Priority Data

Mar. 9, 2011   (FR) ...................................... 11 51923

(51) Int. Cl.
*H02J 7/00* (2006.01)
*B60L 11/18* (2006.01)
*H02J 1/08* (2006.01)
*H02J 1/00* (2006.01)

(52) U.S. Cl.
CPC ........... *H02J 7/0068* (2013.01); *B60L 11/1853* (2013.01); *B60L 11/1866* (2013.01); *H02J 1/08* (2013.01); *H02J 7/0018* (2013.01); *H02J 7/0054* (2013.01); *B60L 2210/12* (2013.01); *B60L 2210/14* (2013.01); *B60L 2240/547* (2013.01); *H02J 2001/008* (2013.01); *H02J 2007/0059* (2013.01); *Y02T 10/7005* (2013.01); *Y02T 10/7011* (2013.01); *Y02T 10/7055* (2013.01); *Y02T 10/7061* (2013.01); *Y02T 10/7225* (2013.01); *Y02T 10/7233* (2013.01)

(58) Field of Classification Search
CPC .. H02J 7/0016; H02J 7/0018; Y02T 10/7055; Y02E 60/12; H01M 10/441
USPC .......................................................... 320/118
See application file for complete search history.

(56) References Cited

U.S. PATENT DOCUMENTS

| | | | |
|---|---|---|---|
| 6,111,388 A | 8/2000 | Mukainakano | |
| 6,281,662 B1 | 8/2001 | Flohr | |
| 2002/0074985 A1 | 6/2002 | Matsui et al. | |
| 2002/0167291 A1 | 11/2002 | Imai et al. | |
| 2004/0027092 A1 | 2/2004 | Patel et al. | |
| 2006/0006841 A1* | 1/2006 | Lee | 320/116 |
| 2007/0139007 A1* | 6/2007 | Lim et al. | 320/116 |
| 2007/0170889 A1* | 7/2007 | Ishikawa et al. | 320/116 |
| 2008/0061741 A1* | 3/2008 | Yamamoto | 320/118 |
| 2008/0116850 A1 | 5/2008 | Konishi et al. | |
| 2009/0278496 A1 | 11/2009 | Nakao et al. | |
| 2010/0117593 A1* | 5/2010 | Piccard et al. | 320/104 |
| 2010/0213897 A1* | 8/2010 | Tse | 320/116 |
| 2010/0295509 A1* | 11/2010 | Moussaoui et al. | 320/118 |
| 2011/0089898 A1* | 4/2011 | Lee et al. | 320/116 |

FOREIGN PATENT DOCUMENTS

WO    WO2008/137764    11/2008

* cited by examiner

*Primary Examiner* — Arun Williams
(74) *Attorney, Agent, or Firm* — Occhiuti & Rohlicek LLP

(57) ABSTRACT

A charge balancing system for a power battery includes a number of modules connected in series, each having two accumulator stages, each having an accumulator and isolated parallel converters connected to associated accumulator stages and to a low-voltage power system for supplying auxiliaries of an automobile. The converters have first unidirectional converters, each connected across terminals of a module and to the supply system, and second unidirectional converters each connected to the supply system and across the terminals of the accumulator stages, and a control unit for the first and second unidirectional converters. The control unit is configured for controlling a first converter to bring the modules to a similar charge level, for controlling a energy transfer from the battery to the supply system via the first converters, and for controlling a second converter to bring the associated accumulator stages of a module to a similar charge level.

14 Claims, 6 Drawing Sheets

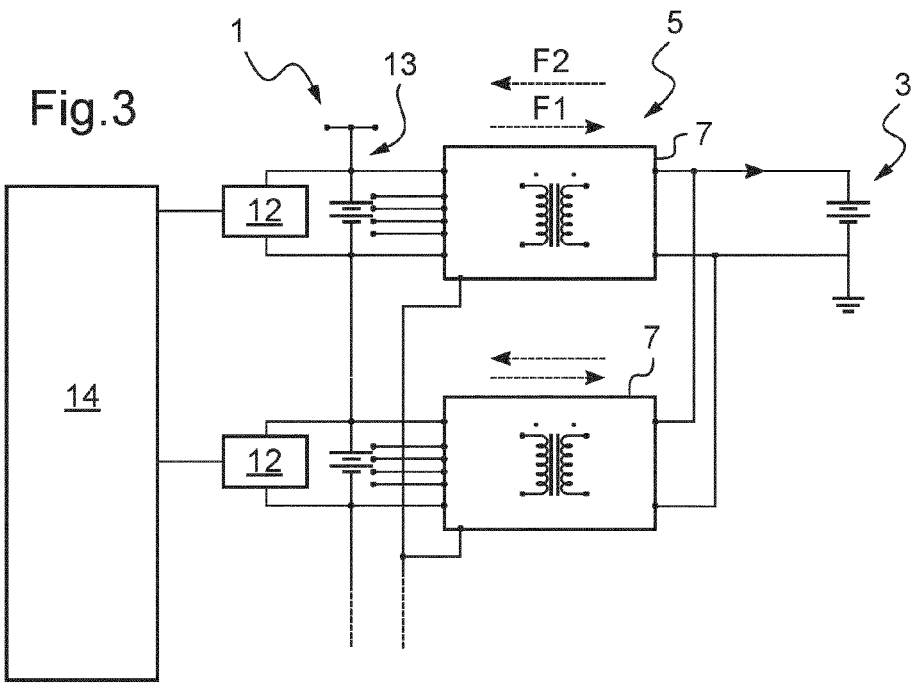
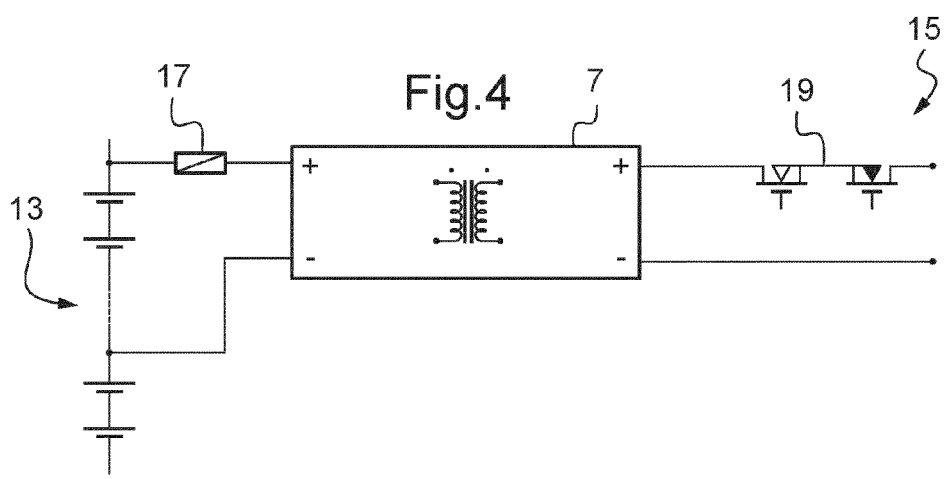
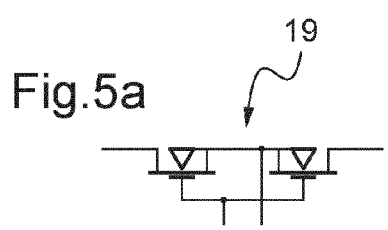
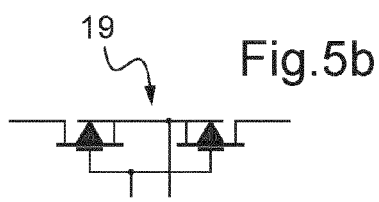

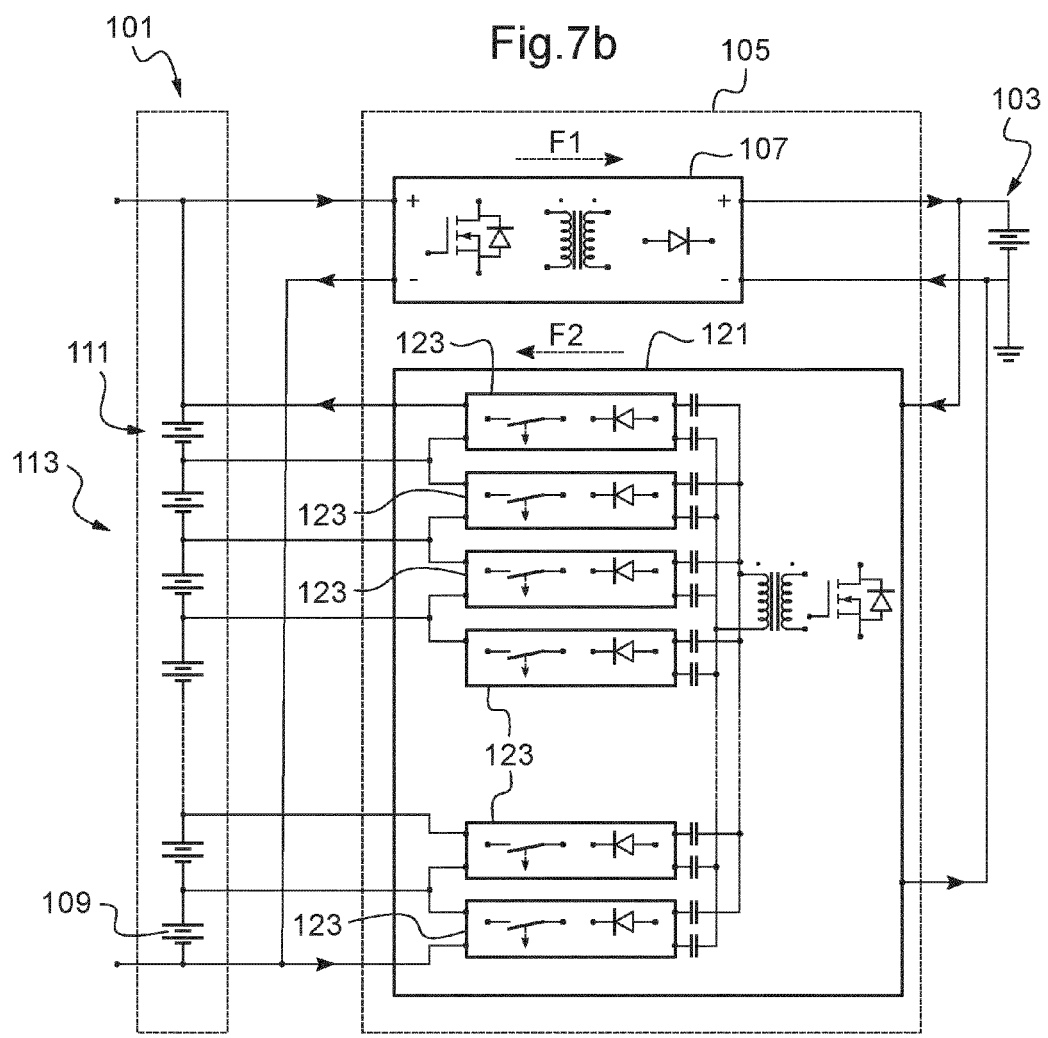

CHARGE BALANCING SYSTEM FOR BATTERIES

CROSS REFERENCE TO RELATED APPLICATION

This application is the national phase under 35 USC 371 of international application no. PCT/EP2012/053880, filed Mar. 7, 2012, which claims the benefit of the priority date of French application no. 1151923, filed Mar. 9, 2011. The contents of the aforementioned applications are incorporated herein in their entirety.

FIELD OF DISCLOSURE

The invention relates to a charge balancing system for batteries.

BACKGROUND

The invention relates to a battery that may notably be used in the field of electric and hybrid transport and in onboard systems. The invention relates, in particular, to batteries of the lithium-ion (Li-ion) type adapted to these kind of applications, owing to their possibility of storing a high energy with a low mass. The invention is also applicable to super-capacitors.

An electrochemical accumulator has a nominal voltage of the order of a few volts, and more precisely, 3.3 V for Li-ion batteries containing iron phosphate and 4.2 V for a Li-ion technology based on cobalt oxide.

If this voltage is too low with respect to the demands of the system to be powered, several accumulators are placed in series.

It is also possible to dispose, in parallel with each accumulator linked in series, one or more accumulators in order to increase the available capacity and hence to supply a higher current and power. The accumulators associated in parallel thus form a stage. A stage is composed of a minimum of one accumulator. The stages are arranged in series in order to reach the desired voltage level.

SUMMARY

The association of the accumulators is called a battery of accumulators.

The charging or discharging of an accumulator respectively results in an increase or decrease in the voltage across its terminals. An accumulator is considered to be charged or discharged when the latter has reached a voltage level defined by the electrochemical process.

In a circuit using several stages of accumulators, the current flowing through the stages is the same.

The level of charge or of discharge of the stages therefore depends on the intrinsic characteristics of the accumulators, namely the intrinsic capacity and the undesirable internal series and parallel resistances of the electrolyte or of the contact between the electrodes and the electrolyte. Differences in voltage between the stages are accordingly possible owing to the disparities in manufacture and in aging of the accumulators.

For an accumulator using Li-ion technology, too high or too low a voltage, referred to as threshold voltage, may damage or destroy the latter.

For example, the overcharging of a Li-ion accumulator containing cobalt oxide can lead to its thermal runaway and to it catching fire. For a phosphate-based Li-ion accumulator, overcharging results in a decomposition of the electrolyte which reduces its lifetime or may damage the accumulator.

Too aggressively discharging which leads to a voltage lower than 2 V, for example, results, between other phenomena, in the oxidation of the current collector of the negative electrode when the latter is made of copper and hence a reduction in performance of the accumulator.

Consequently, the monitoring of the voltages across the terminals of each stage of accumulators is therefore necessary when they are charged and discharged for reasons of safety and reliability. The information can then be transmitted to a control circuit in order to stop the charging or the discharging of the battery when a stage has reached its threshold voltage.

However, on a battery with several stages of accumulators disposed in series, if the charging is stopped when the stage with the most charge reaches its threshold voltage, the other stages might not be totally charged. Conversely, if the discharge is stopped when the most discharged stage reaches its threshold voltage, the other stages might not be totally discharged. The charging of each stage of accumulators is accordingly not fully exploited which represents a major problem in applications of the transport and onboard types with challenging constraints for autonomy.

According to known solutions, charge balancing systems, for example those known as energy dissipation systems, or those known as energy transfer systems, are designed to optimize the charge of the battery, and hence its autonomy, by bringing the stages of accumulators connected in series to an identical state of charge and/or discharge.

With energy dissipation charge balancing systems, the voltage across the terminals of the stages is made uniform by diverting the charge current of one or more stages having reached the threshold voltage and by dissipating the energy into a resistance. As a variant, the voltage across the terminals of the stages is made uniform by discharging one or more stages having reached the threshold voltage.

However, such charge balancing systems using energy dissipation have the major drawback of consuming more energy than necessary for charging the battery. The reason for this is that several accumulators must be discharged or the charge current diverted from several accumulators for the last accumulator(s) with slightly less charge to finish its/their charging. The energy dissipated can hence be much higher than the energy of the charge or charges needing to be finished.

In addition, the excess energy is dissipated as heat, a fact which is not compatible with the constraints of integration into applications of the transport and onboard types, and the fact that the lifetime of the accumulators is greatly reduced when the temperature increases.

The charge balancing systems using energy transfer, on the other hand, exchange energy between the battery of accumulators or an auxiliary energy supply system and the stages of accumulators.

The energy transfer may take place either in a unidirectional manner, from the battery to the stages or from the stages to the battery, or in a bidirectional manner, from the battery to the stages and from the stages to the battery or from stage to adjacent stage.

With regard to bidirectional transfer in the charge balancing systems from stage to adjacent stage, the energy runs through a number of devices substantially equal to the distance between of the accumulators to be balanced. As a consequence of this arise the two major drawbacks of these devices, namely the long time needed for balancing a battery and the low efficiency of the energy transfer due to the accumulation of the losses in the devices solicited.

With regard to unidirectional transfer, according to a known solution, the end of charging of a battery is determined by the last stage to reach the threshold voltage. For finishing the charging of a battery, the energy is taken from one or more stage(s) and it is returned to all of the stages. When one or more stage(s) of accumulators is or are a little less charged up, the energy is not then transferred as a priority to this or these latter stages which needs or need it, but also to the stage or stages from which the energy is taken. The charge balancing therefore requires the energy to be taken from all of the stages at the end of charging in order to avoid charging them up to too high a voltage. The charge balancing therefore takes place with a high level of losses because of the large number of converters in operation. Moreover, the accumulators already fully charged have components of AC or DC current flowing through them that are not useful.

The aim of the invention is therefore to provide an improved charge balancing system not exhibiting these drawbacks of the state of the art.

For this purpose, the subject of the invention is a charge balancing system for a power battery comprising at least two accumulator stages connected in series, an accumulator stage comprising at least one accumulator, characterized in that said system comprises:
- a plurality of isolated converters configured in parallel respectively connected, on the one hand, to a predefined number of associated accumulator stages, and on the other hand, to a low-voltage power supply system for electrical auxiliaries of an automobile vehicle, and
- a control unit for said converters configured for controlling at least one converter in such a manner as to bring the predefined number of associated accumulator stages to a similar level of charge or discharge, and for controlling a transfer of energy from the power battery to said low-voltage supply system via said converters in such a manner as to supply power to said auxiliaries.

Said system may furthermore comprise one or more of the following features, taken separately or in combination:
- for each accumulator stage, said system comprises an associated isolated converter,
- said converters are bidirectional.

According to one aspect of the invention, said power battery comprises a predefined number of modules connected in series, a module comprising at least two accumulator stages, an accumulator stage comprising at least one accumulator, and said system comprises:
- a plurality of isolated converters configured in parallel respectively connected, on the one hand, to a predefined number of associated accumulator stages, and on the other hand, to a low-voltage power supply system for electrical auxiliaries of an automobile vehicle, comprising a plurality of first unidirectional converters respectively connected across the terminals of a module, on the one hand, and to the low-voltage supply system, and a plurality of second unidirectional converters respectively connected to the low-voltage supply system, on the one hand, and across the terminals of the accumulator stages of said module on the other, and
- a control unit for said converters configured for controlling at least a first converter in such a manner as to bring the predefined number of associated modules to a similar level of charge or discharge, and for controlling a transfer of energy from the power battery to said low-voltage supply system via said first converters, and for controlling at least a second converter in such a manner as to bring said associated accumulator stages of a module to a similar level of charge or discharge.

Said system may furthermore comprise one or more of the following features, taken separately or in combination:
- the control unit for said converters is configured for controlling a transfer of energy in a first direction from the power battery to said low-voltage supply system via said first converters, and for controlling a transfer of energy in a second direction from said low-voltage supply system to the power battery via at least said second converter,
- said system is configured for transferring energy from one module to said stages of said module via said first and second converters,
- the control unit is configured for controlling at least a first converter for transferring energy from one module in the first direction, defining at least one stage of said module to be charged up, and for controlling the second converter in parallel with the stage to be charged up so as to transfer energy in the second direction, in such a manner as to transfer the energy of said module, transferred to said first converter, to said stage to be charged up of said module via said second converter,
- said system is configured for transferring energy from a first module to a second module via said first and second converters,
- the control unit is configured for controlling a first converter for transferring energy from a first module in the first direction to said first converter, defining at least a second module to be charged up, and for controlling at least a second converter associated with said second module so as to transfer the energy in the second direction, in such a manner as to transfer the energy of said module, transferred to said first converter, to said second module, via said second converter,
- a second converter comprises a plurality of charging devices connected in parallel and respectively associated with an accumulator stage in such a manner as to charge up said associated accumulator stage,
- said system comprises a protection means in case of a short-circuit comprising a plurality of fuses between said converters and the power battery,
- said system comprises a plurality of fuses at the output of said charging devices, on the power battery side,
- said system comprises a plurality of diodes, respectively connected in series with said converters, on the low-voltage supply system side,
- said system comprises a plurality of bidirectional switches, respectively connected in series with said converters, on the low-voltage supply system side,
- said bidirectional switches respectively comprise two transistors configured in opposition,
- said system comprises: a plurality of first unidirectional switches respectively connected in series with said first converters, at the output of said converters, and a plurality of second unidirectional switches respectively connected in series with said second converters, at the input of said second converters.

BRIEF DESCRIPTION OF THE FIGURES

Other features and advantages of the invention will become more clearly apparent upon reading the following description, presented by way of illustrative, non-limiting, example, together with the appended drawings amongst which:

FIG. 3 shows a partial view of a power battery and a charge balancing system for the power battery having bidirectional converters across the terminals of modules of the power battery, FIG. 4 shows a partial and schematic view of a bidirectional converter together with a device for protection in the case of a short-circuit, FIG. 5a shows one variant embodiment of the switch of the protection device in FIG. 4, FIG. 5b shows another variant embodiment of the switch of the protection device in FIG. 4, FIG. 7b shows the battery in FIG. 7a with a charge balancing system comprising two unidirectional converters across the terminals of a module of the battery according to one exemplary embodiment.

DETAILED DESCRIPTION

In these figures and in the following part of the description, the elements that are substantially identical carry the same references.

FIGS. 1 to 6 show schematically a first embodiment and FIGS. 7 to 11 a second embodiment according to the invention.

The elements described of the second embodiment that are substantially identical to elements of the first embodiment carry the same references as these elements of the first embodiment but to which 100 has been added.

First Embodiment

Figure 1:
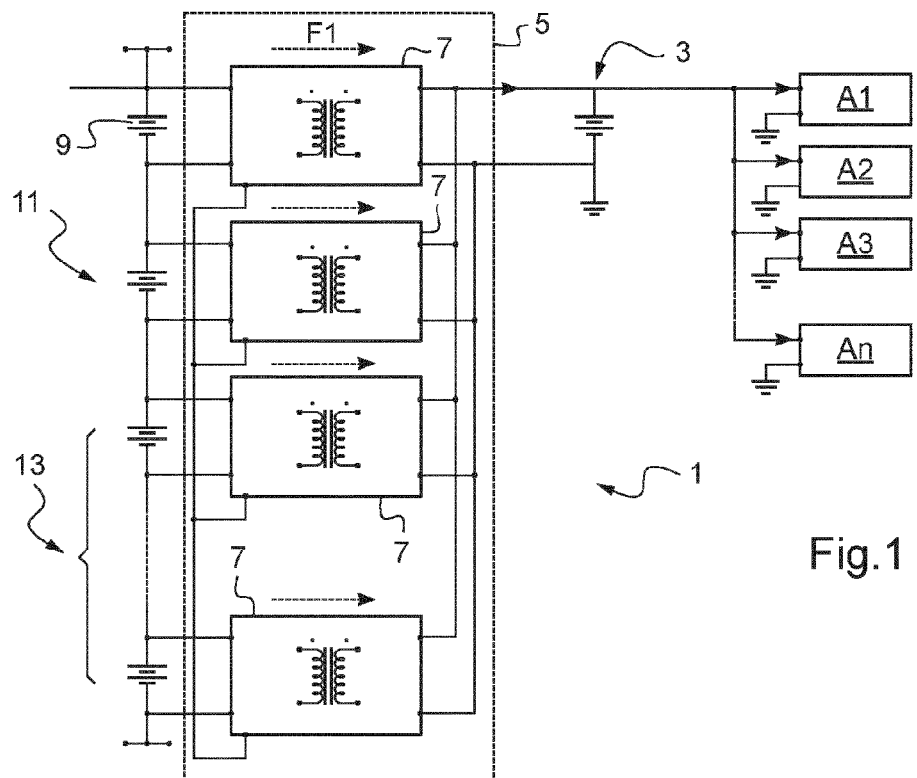
FIG. 1 shows schematically one embodiment of a charge balancing system for a power battery, using energy transfer between the power battery and an auxiliary electrical system.

The first embodiment is described with reference to FIG. 1 in which are illustrated:
- a power battery 1 with a high voltage in the range for example between 48V and 750V, for example for supplying power to the motor of a hybrid or electric vehicle, and isolated from the chassis of the vehicle,
- an auxiliary battery 3 with a voltage below that of the power battery 1, for example with a voltage of 12V, for supplying power for example to the auxiliaries A1 to An in the vehicle, and
- a charge balancing system 5 for the power battery 1, comprising a plurality of converters 7 connected in parallel between the two batteries 1 and 3 so as to enable the supply of power to the auxiliary battery 3 by the power battery 1. Each converter 7 is constructed with a galvanic isolation so as to ensure the safety of the auxiliaries A1 to An.

The converters 7 are illustrated schematically.

The power battery 1 is a battery of one or more accumulator(s) 9. This battery 1 may comprise several accumulators 9 connected in series.

This battery 1 may also comprise one or more additional accumulators placed in parallel with the accumulators 9 in series in such a manner as to form accumulator stages 11. Each stage 11 can therefore comprise one accumulator 9 or several accumulators 9 connected in parallel.

The battery 1 can comprise several modules 13 connected in series, each module 13 comprising a predefined number of stages 11 of accumulators.

By way of illustrative example, a 19.6 kWh battery with a voltage of 325V and a capacity of 60 Ah may be provided. This battery 1 comprises for example eight modules 13, each module 13 comprising twelve stages 11 of accumulators. Each module 13 therefore has a voltage of 40.6 V.

With such a series association of modules 13, a defective module 13 can readily be replaced.

In addition, according to one variant not shown, each module 13 may furthermore be connected in parallel with another module 13.

A converter 7 may be connected across the terminals of an accumulator 9, or across the terminals of an accumulator stage 11, or alternatively across the terminals of a module 13 of stages of accumulators.

The plurality of converters 7 replaces the single DC/DC converter known from the prior art connected across the terminals of the battery.

These converters 7 provide, in addition, a charge balancing function for the power battery.

The power handling capability of the converters 7 for the charge balancing system 5 is designed for such a transfer of energy from the power battery 1 to the auxiliary battery 3.

By way of example, for a battery 1 such as defined hereinabove with eight modules 13 with twelve stages 11 of accumulators each, eight converters 7 can be provided with a voltage of 40.6V/12V across the terminals of the eight modules 13. The converters 7 are therefore designed to handle an energy transfer from a module 13 with a voltage of 40.6V to the low-voltage 12V supply system.

Moreover, the plurality of converters 7 are lower power converters as compared with the single converter of the prior art. Indeed, for example for a total power of 1 kW in the low-voltage supply system, each converter 7 is 125 W.

Thus, with only one set of electronics for the charge balancing system 5, the energy from the accumulators 9 of the power battery 1 is transferred to the auxiliary battery 3, and it is this energy transferred to the auxiliary electrical system which is used to balance the accumulators 9 of the power battery 1 and which is also used to supply power to the low-voltage supply system.

In addition to the balancing function, the charge balancing system 5 therefore fulfils the role of supplying the accessory 12 volts to the vehicle.

Furthermore, owing to the presence of the plurality of converters 7, the 12V battery can be eliminated. Indeed, the redundancy of the converters 7 ensures the availability of the converters 7.

Thus, even in the case of a failure of a converter 7, the other operational converters 7 are able to guarantee the supply of power to the low-voltage system.

According to one variant embodiment, converters 7 may be used that are controlled in ON/OFF mode according to the current demands of the accessories.

Thus, the charge balancing can be implemented by turning on the converter(s) 7 across the terminals of the module(s) 13 having the most energy, more precisely having a higher voltage than the other modules 13. The enabling of the converter(s) 7 allows this(these) module(s) with the most charge to be partially discharged by transferring the energy to the low-voltage supply system of 12V.

The use of other converters 7, such as for example flyback converters, may of course be envisioned.

Furthermore, in the case where the modules 13 do not all exhibit the same state of aging, for example following the replacement of one or more modules 13, the use of the new module(s) 13 may be favored over the use of the older modules 13.

Figure 2:
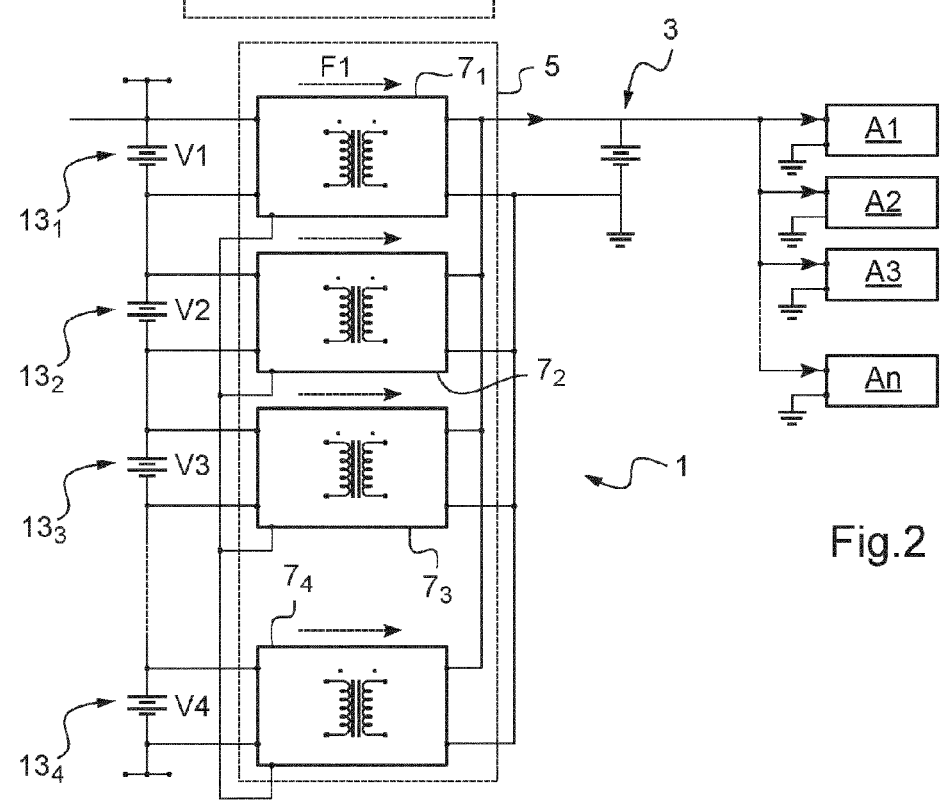
FIG. 2 illustrates one example of a power battery comprising four modules of accumulator stages and the charge balancing system in FIG. 1.

In order to illustrate the principle of inter-module charge balancing 13, reference is made to FIG. 2 showing four modules $13_1$ to $13_4$ with respective voltages $V_1, V_2, V_3, V_4$ and respectively associated with a converter $7_1, 7_2, 7_3, 7_4$.

By way of example, the situation is considered in which:
the first module $13_1$ has a voltage $V_1$ of 2.6V,
the second module $13_2$ has a voltage $V_2$ of 3.3V,
the third module $13_3$ has a voltage $V_3$ of 3.4V, and
the fourth module $13_4$ has a voltage $V_4$ of 2.8V.

The second and third modules $13_2$ and $13_3$ have respectively a voltage of 3.3V, and of 3.4V, and hence have the highest charge. The converters $7_2$ and $7_3$, respectively associated with these second and third modules $13_2$ and $13_3$ with the highest charge, are turned on in order to partially discharge them.

The charge balancing energy from the modules 13 is therefore transferred, in a first direction as illustrated by the arrow F1, via the converters 7 to the low-voltage 12V supply system, and this energy allows power to be supplied to the auxiliaries A1 to An of the vehicle.

In addition, during this discharge, if the power consumption on the low-voltage supply system is insufficient, for example because the vehicle is stopped, additional power consuming systems may be turned on in order to increase the power consumption on the 12V supply, such as the heating or the air conditioning system.

The description is presented here for charge balancing between modules 13. Of course, the charge balancing may be implemented in a similar manner between accumulator stages 11 by virtue of a plurality of converters 7 respectively connected across the terminals of an accumulator stage 11.

The charge balancing system 5 may additionally comprise (cf. FIG. 3) a voltage measurement device 12 for measuring the voltage of each stage 11 or module 13, and for transferring voltage information to a control unit 14.

Using this voltage information, this control unit 14 can determine whether a stage 11 or a module 13 needs to be discharged and control as a consequence the enabling of the converter 7 in parallel in order to balance the modules 13 by transferring the energy to the low-voltage supply system.

For this purpose, the control unit 14 comprises at least one processing means for:
receiving the voltage information,
analyzing the voltage information,
determining one or more stages 11 to be discharged, and
controlling one or more converters 7 in parallel with said stages 11 having been determined.

Bidirectional Charge Balancing System

Furthermore, the charge balancing system 5 may be bidirectional.

The energy is then transmitted in both directions (cf. FIG. 3), in other words:
from the power battery 1 to the low-voltage supply system in order to supply power to the auxiliaries A1 to An, in a first direction as is illustrated by the arrow F1, and
from the auxiliaries supply system to the power battery 1, in a second direction as is illustrated by the arrow F2.

The charge balancing may therefore be implemented when discharging or when charging the accumulator stages 11.

As is illustrated in FIG. 3, for this purpose, according to the first embodiment, a single converter 7 that is bidirectional in current may be provided which allows, on the one hand, the modules 13 with the most charge to be discharged by using the charge balancing energy in order to supply power to the low-voltage system, and on the other hand, the stages 11 of the modules 13 to be charged up from the low-voltage supply system.

The stages 11 of the modules 13 can thus be balanced without the need for an external power supply.

In addition, with this solution, the charge balancing can even be implemented with no power consumption on the low-voltage 12V supply system. This is because the charge balancing energy discharged in the first direction F1 can then be sent back to the accumulator stages 11 in the second direction F2.

The auxiliary battery 3 can be eliminated especially since it has lost its function as energy storage buffer.

A module that is autonomous for its own charge balancing is then obtained.

This charge balancing can allow the disparities in the levels of charge of the various stages 11 to be eliminated, during or following the charging of the power battery 1 but also during or following discharging of the power battery 1.

Furthermore, as is illustrated by FIG. 4, a device 15 for protection against short-circuits may be provided.

For this purpose, the protection device 15 can comprise:
a fuse 17 disposed at the input of the converter 7, for example on the positive (+) terminal of the converter 7, in other words in the example illustrated on the power battery 1 side, and
a switch 19 at the output of the converter 7, for example on the positive (+) terminal of the converter 7, in other words in the example illustrated on the low-voltage supply system side.

The fuse 17 allows the converter 7 to be isolated in the case of a short-circuit and the switch 19 allows the converter 7 to continue to operate. The fuse and the switch may be placed on the + poles or the − poles of the converters.

According to the example illustrated, the switch 19 is bidirectional in voltage and in current.

This switch 19 comprises, by way of example, two MOS transistors, a first being N-type and a second being P-type, configured in opposition.

Variants of such a switch 19 are illustrated in FIGS. 5a and 5b; FIG. 5a showing a first variant with two N-type transistors configured in opposition and FIG. 5b showing a second variant with two P-type transistors configured in opposition.

Referring again to FIG. 4, the switch 19 is arranged at the output of the converter 7. The switch 19 may be arranged on the positive (+) terminal or on the negative (−) terminal of the converter 7.

According to one alternative to the switch 19, a diode 19' can be provided at the output of the converter 7 on the positive (+) terminal of the converter or on the negative (−) terminal 7.

The availability of the bidirectional converters 7 can thus be increased, so as to be able to eliminate the auxiliary battery 3 by increasing the tolerance in the case of a failure of one or more converters 7 by virtue of the protection device 15.

Indeed, because of the redundancy of the plurality of converters 7 and of the protection device 15, even in the case of a defective converter 7, said charge balancing system short-circuiting the other converters is avoided, such that power can continue to be supplied to the low-voltage 12V system.

Operation of the Bidirectional Charge Balancing System

Charging Phase of the Power Battery

One example is now described of operation of the bidirectional balancing system 5 for balancing voltage levels in the case of the charging of a power battery 1, in such a manner as to bring all the stages 11 to a nominal voltage level.

This balancing both between stages 11 of a module 13 and between modules 13 can be implemented at the same time as the charging of the battery 1.

For the balancing between the stages 11 of a module 13, energy is taken from the module 13 (in the first direction of flow of the current F1) then redistributed (in the second direction of flow of the current F2) toward the stages 11 with the least charge.

In order to define one or more stages to be charged up, a threshold can be defined, and when the voltage level of a stage 11 is lower than this threshold, the energy is redistributed toward this stage 11. For example, an average threshold may be defined corresponding to the average of the voltage levels of the stages 11 of the module 13.

Thus, when a stage 11 has a voltage lower than the average of the levels of charge of the stages 11 of the module 13, the energy taken from the module 13 is distributed to this stage 11.

In order to perform this measurement, the voltage measurement device 12 can measure the voltage of each stage 11 and can transfer voltage information to the control unit 14.

Using this voltage information, this control unit 14 can determine whether a stage 11 needs to be charged up, for example by comparison with an average of level of charge within the module 13, and control as a consequence the enabling of the converter 7 in parallel for charging up the stage or stages 11 thus determined.

Furthermore, with regard to the charge balancing between the modules 13, the voltage measurement device 12 can be configured for measuring the voltage of each module 13 and for transferring voltage information to the control unit 14 which, based on this voltage information, can determine from which module 13 energy can be extracted and into which module 13 it is to be re-injected.

The measurement device 12 can carry out these measurements at regular intervals.

The control unit 14 can comprise at least one processing means for analyzing the voltage levels of each module 13 and classifying them for example by increasing or decreasing order. The modules 13 with the most charge are then used for recharging the modules 13 that are most discharged.

One example of charge balancing can be to take the energy from the module 13 with the most charge and to transfer it to the most discharged module 13, to take the energy from the module with the second most charge and to transfer it to the second most discharged module, and so on.

In order to illustrate this principle, the example illustrated in FIG. 2 is taken which shows four modules $13_1$ to $13_4$ with respective voltages $V_1, V_2, V_3, V_4$ and respectively associated with a converter $7_1, 7_2, 7_3, 7_4$.

By way of example, the situation is adopted in which:
the first module $13_1$ has a voltage $V_1$ of 2.6V,
the second module $13_2$ has a voltage $V_2$ of 3.3V,
the third module $13_3$ has a voltage $V_3$ of 3.4V, and
the fourth module $13_4$ has a voltage $V_4$ of 2.8V.

Figure 6:
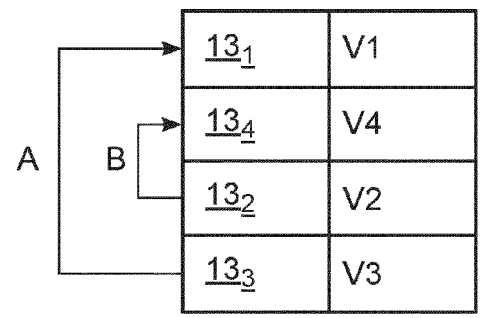
FIG. 6 is an illustrative schematic table showing a classification of the voltage levels of the modules in order to define an inter-module charge balancing.

This information may be classified as is illustrated schematically by the table in FIG. 6, such that the voltage levels are classified by increasing order: $V_1, V_4, V_2, V_3$.

The control unit 14 can then control the charging of the first module $13_1$ with the least charge using energy taken from the module $13_3$ with the most charge, and the charging of the module $13_4$ using the second module $13_2$, as is respectively illustrated by the arrows A and B.

The control unit 14 can be configured for halting the transfer of energy from a more charged module 13 to a less charged module 13 when the difference in voltage between the modules is less than a predetermined value.

Discharging Phase of the Battery

One example of operation of the bidirectional charge balancing system 5 following the discharging of the power battery 1 is now described.

The charge balancing both between stages 11 of a module 13 and between modules 13 can also be implemented at the same time as the discharge of the battery 1.

The modules 13 with the most charge are used first and foremost for supplying power to the low-voltage 12V supply system, for example when the vehicle into which the battery is incorporated is being driven. At the end of the discharge, the voltage level is able to come close to the minimum voltage permitted at the end of discharge for each module 13.

During this discharge, if the power consumption on the 12V supply system is insufficient, additional consuming systems can be turned on in order to increase the consumption on the 12V system, such as the heating or the air conditioning of the vehicle.

Conversely, if the power consumption is too high, the operation of the auxiliaries can be limited.

For example, when the vehicle is idling, the charge balancing takes place by re-injecting the energy taken from the module into the least charged stages.

The charge balancing may also take place from the simple fact that energy is taken from the module 13.

Second Embodiment

Charge Balancing System with Two Unidirectional Converters

Figure 7A:
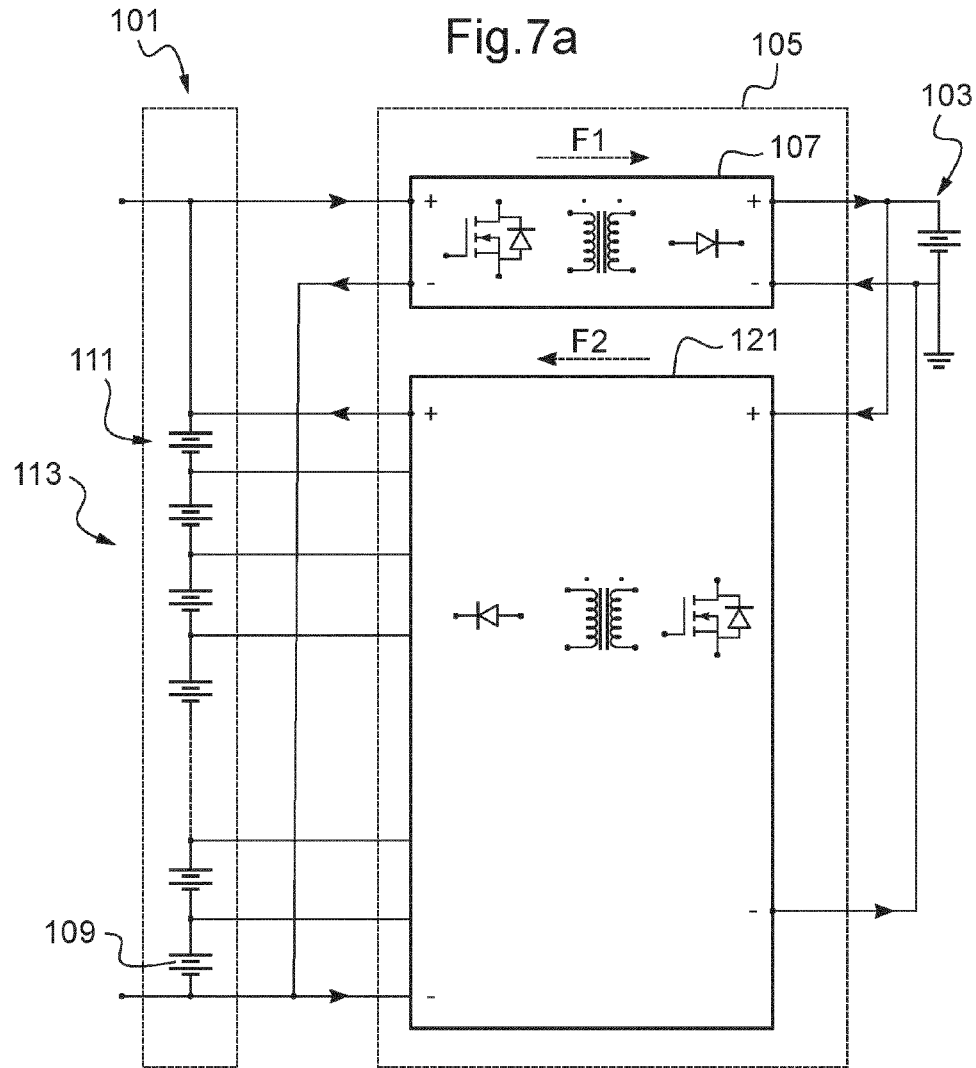
FIG. 7a shows schematically a power battery comprising at least one module of accumulator stages, a charge balancing system for the power battery and an auxiliary battery.

With reference to FIG. 7a, the second embodiment described differs from the first embodiment in that the bidirectional charge balancing system 105 comprises a first unidirectional converter 107 and a second unidirectional converter 121 for each module 113.

The converters 107 and 121 are shown schematically in FIG. 7a.

The first converter 107 is connected across the terminals of the module 113.

With reference to FIG. 7b, the second converter 121 comprises a predefined number of charging devices 123 respectively associated with an accumulator stage 111. The charging devices 123 are therefore connected in parallel.

The charging devices 123 are illustrated schematically in FIG. 7b.

Thus, it is possible to implement both a charge balancing between the modules 113 in the first direction from the power battery 101 to the low-voltage supply system indicated by the arrow F1, by means of the first converters 107, and a charge balancing between the accumulator stages 111 of the modules 113 in the second direction from the low-voltage supply system to the power battery 101 indicated by the arrow F2, by means of the charging devices 123 of the second converters 121.

Thus, the converters 107 and 121 do not transfer the same orders of magnitude of power. Each unidirectional converter 107, 121 is conditioned to respond to the power requirement which is specific to each converter.

Indeed, the first converter 107 powers the auxiliary electrical system and balances the modules 113; a power of several hundreds of watts is needed to provide this function.

The second converter 121 balances the stages 111 within a module 113; a power of a few tens of watts is required to provide this function.

The ratio between these orders of magnitude of power is around 10.

Moreover, these two functions must be able to be provided at the same time.

The employment of these two converters 107 and 121 capable of transferring powers of different orders of magnitude, and capable of being used at the same time, is preferable to the use of a single bidirectional converter.

Figure 8:
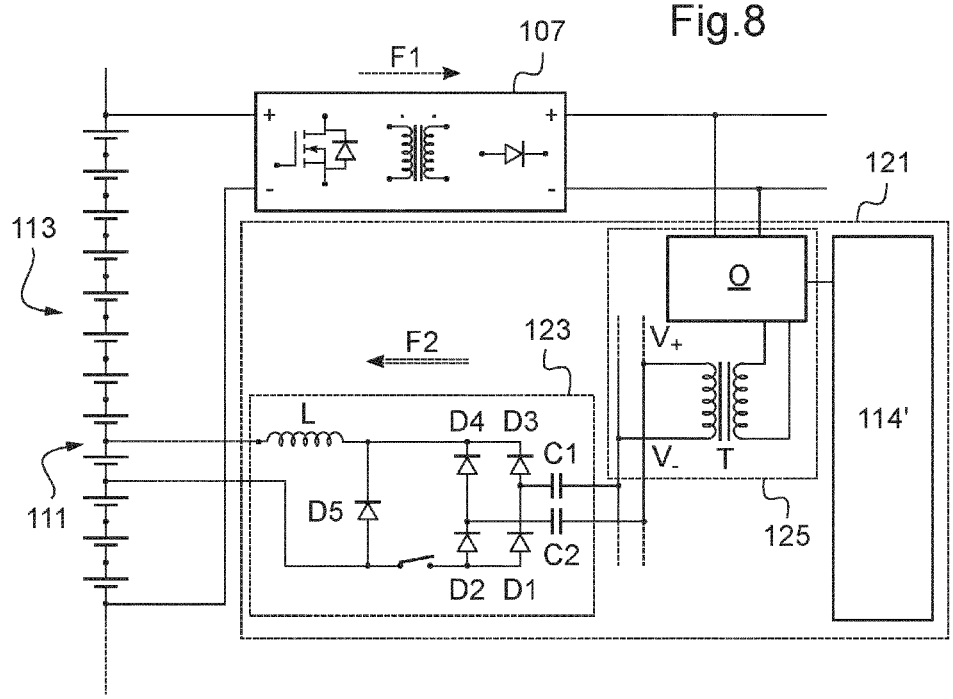
FIG. 8 shows a partial and schematic view of one exemplary embodiment of a charge balancing system for the power battery having two unidirectional converters across the terminals of a module of the battery with one exemplary embodiment of a charging device across the terminals of one stage of the battery.

One exemplary embodiment of a charging device 123 is illustrated schematically in FIG. 8.

According to this exemplary embodiment, a charging device 123 is connected, on the one hand, to the negative pole, denoted N, and to the positive pole, denoted P, of an accumulator stage 111 and on the other hand, to the positive pole, denoted $v_+$, and to the negative pole, denoted $v_-$, of a voltage generator 125.

The voltage generator 125 can be a single unit and connected to all of the charging devices 123.

One voltage generator 125 per charging device 123 may also be provided, or else one voltage generator 125 for several charging devices 123.

A voltage generator 125 supplies the charging device 123 with voltage pulses of positive, negative or positive and negative polarity and with a form that can be variable, for example a square or sinusoidal wave.

The voltage generator 125 is controlled by a control device (not shown).

The voltage generator 125 can be connected across the terminals of a module 13 or across the terminals of the battery 101 or, alternatively, across the terminals of the auxiliary battery 103.

This voltage generator 125 comprises for example a transformer T and an inverter O.

The inverter O is for example controlled in ON/OFF mode.

According to the example illustrated, the transformer T has a primary winding and a secondary winding.

As a variant, a transformer could be provided with one primary winding and several secondary windings for example respectively connected to a module 13.

Furthermore, the voltage generator 125 has a positive pole $v_+$ and a negative pole $v_-$.

By way of example, the charging device 123 comprises:
an inductor L with a first end La and a second end Lb,
a first capacitor C1, one end of which is connected to the first end La of the inductor L, and whose other end is connected to the negative pole $v_-$ of the voltage generator 125,
a second capacitor C2 connected to the positive pole $v_+$ of the voltage generator 125,
a first diode D1 whose anode and cathode are respectively connected to the pole N of the associated stage 11 and to the second end of the first capacitor C1,
a second diode D2 whose anode and cathode are respectively connected to the pole zN of the associated stage 11 and to the second end of the second capacitor C2,
a third diode D3 connected by its cathode to the first end La of the inductor L and by its anode to the cathode of the first diode D1,
a fourth diode D4 connected by its cathode to the first end La of the inductor L and by its anode to the cathode of the second diode D2,
a fifth diode D5 connected by its cathode to the first end La of the inductor L and by its anode to the negative pole N of the associated stage 11,
a switch SW, for example a MOSFET transistor, connected, on the one hand, to the anode of the second diode D2 and, on the other hand, to the negative pole N of the associated stage.

The device for controlling the voltage generator 125 also allows the switch SW to be opened and closed.

Of course, other typologies for the charging device 123 may be envisioned.

In addition, in a manner similar to the first embodiment, a device 121 for protection against short-circuits may also be provided.

Figure 9:
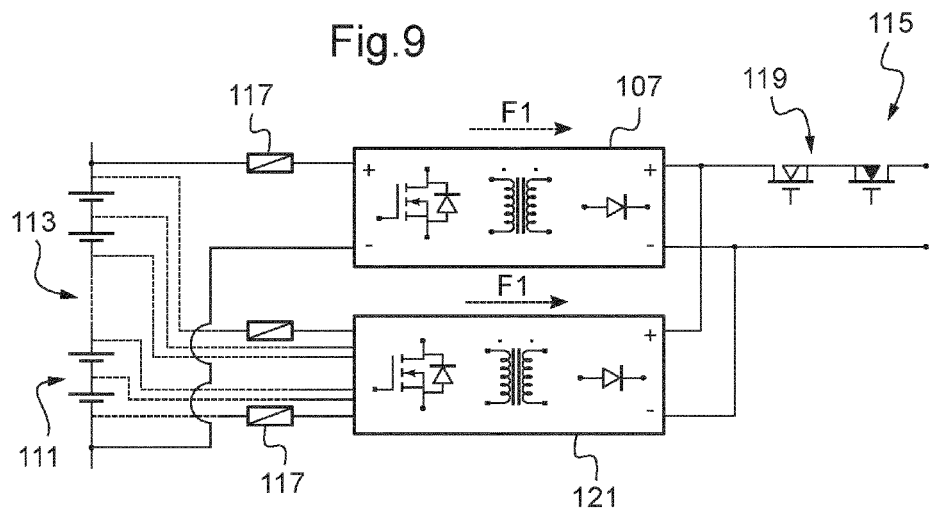
FIG. 9 shows a partial and schematic view of a first and a second converter together with a protection device in the case of a short-circuit.
Figure 10:
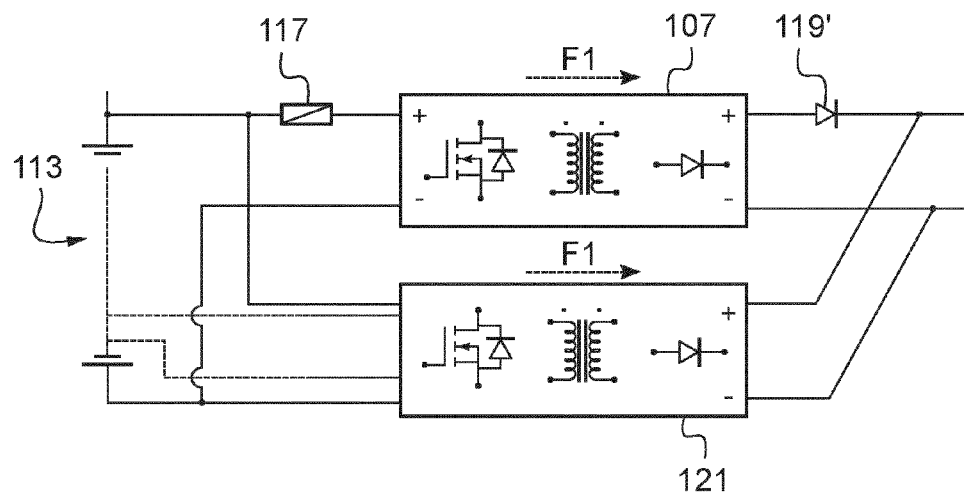
FIG. 10 shows a partial and schematic view of a first and a second converter together with a protection device in the case of a short-circuit according to one variant embodiment.

As is illustrated in FIG. 9, for this purpose, the protection device 115 can comprise:
a fuse 117 disposed at the input of the first converter 107, for example on the positive (+) terminal of the first converter 107, and
a switch 119 at the output of the first converter 107, for example on the positive (+) terminal of the first converter 107.

The fuse 117 and the switch 119 are similar to the fuse 17 and to the switch 19 previously described and may similarly be placed in the + pole or the − pole.

A fuse 117 may also be placed at the output of the second converter 121 on the balancing lines of each stage 111 of the module 113.

The terms "input" and "output" are defined here with respect to the direction of flow of the current. According to the example described, the input of the second converter 121 is therefore located on the low-voltage 12V supply system side and the output on the side of the stages 111 of the module 13.

According to one alternative to the switch 119, a diode 119' may be provided (FIG. 10) at the output of the first converter 107 on the positive (+) terminal of the converter 7 or on the negative (−) terminal of the converter 7.

Figure 11:
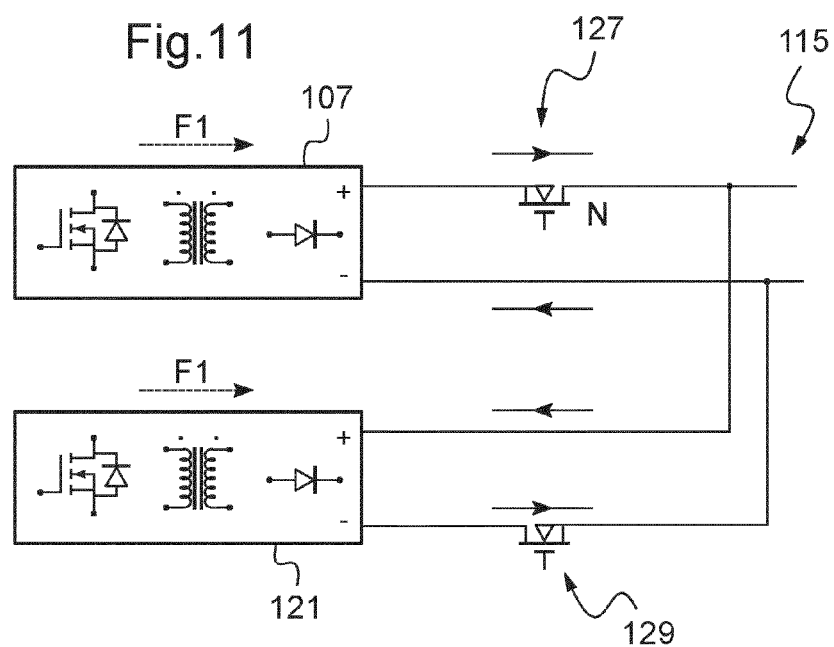
FIG. 11 shows a partial and schematic view of a first and a second converter together with a protection device in the case of a short-circuit according to another variant embodiment.

According to yet another variant illustrated in FIG. 11, the protection device 115 may comprise as an alternative to the switch 119:
a first unidirectional switch 127 at the output of the first converter 107, and
a second unidirectional switch 129 at the input of the second converter 121.

These two switches 127,129 are therefore on the low-voltage 12V supply system side.

For example, the first switch 127 is disposed on the positive (+) terminal at the output of the first converter 107.

For example, the second switch 129 is disposed on the negative (−) terminal at the input of the second converter 121.

These switches 127,129 may be MOS transistors of the P type or of the N type.

The correct operation of the charge balancing system 105 is thus ensured even in the case of a failure whether of a first converter 107 or of a second converter 121.

Operation of the Charge Balancing System

The operation of the first converters 107 for the charge balancing between the modules 113 is similar to the operation of the converters 7 described in the first embodiment when the energy is taken from the module 113 (flow of the current as indicated by the arrow F1) so as to be redistributed to the stages 111, or else toward a module 113 with a lower charge, for example in a charging phase of the power battery 101, or alternatively for supplying power to the low-voltage supply system, for example in a discharge phase of the power battery 101.

The operation of the second converters 121 is, on the other hand, substantially similar to the operation of the converters 7 described in the first embodiment for the distribution of energy (second direction of flow F2 of the current) to the stages 111, the energy being taken from a module 113.

In other words, the control unit for the converters 107,121 is therefore configured for:
controlling a transfer of energy in the first direction F1 from the power battery 101 to the low-voltage supply system via the first converters 107, and for
controlling a transfer of energy in the second direction F2 from the low-voltage supply system to the power battery 101 via the second converters 121.

More precisely, in a similar manner to the first embodiment, for charge balancing between the stages 111 of a module 113, energy is taken from the module 113 (in the first direction of flow of the current F1) then redistributed (in the second direction of flow of the current F2) toward the stages 111 with the least charge.

As previously described, based on voltage information, the control unit can determine whether a stage 111 needs to be charged up, for example by comparison with an average charge level within the module 113, and control as a consequence the enabling of a second converter 121 in parallel so as to charge up the stage or stages 111 determined as needing to be charged up.

Furthermore, with regard to the charge balancing between the modules 113, as previously described, based on voltage information, the control unit 14 can determine from which module 113 energy can be extracted for it to be re-injected into which module 113.

Using this voltage information, this control unit can therefore determine whether a module 113 needs to be discharged and can control as a consequence the enabling of the first converter 107 in parallel so as to balance the modules 113 by transferring the energy in the first direction F1 to the low-voltage supply system.

The control unit may be configured for defining at least a second module 113 to be charged up, and for controlling at least a second converter 121 associated with the second module 113 for transferring the energy in the second direction F2, in such a manner as to transfer energy of the module 113 transferred to the first converter 107 to the second module 113, via said second converter 121.

More precisely, the operation of a charging device 123 is described when the control device 114' controls the transfer of energy to a stage 111, the switch SW of the charging device 123 in parallel with the corresponding stage 111 is closed by the control device 114'.

The voltage generator 125 supplying power to the charging device 123 is also activated by the control device.

When a charging device 123 is turned on and the voltage generator 125 was already in operation, the speed of closure of the switch SW can be controlled in order to avoid supplying too high a current to the stage 111.

The switches are considered as perfect when they are in the off state and do not therefore allow any current to pass when they are in this state.

During a given conduction time, a positive voltage is applied between the terminals of the voltage generator 125. Energy is stored in the inductor L. The current through the inductor L increases proportionally to the voltage applied across its terminals, approximately equal to the voltage on the secondary of the transformer T minus the voltage of the stage 111 under charge.

The current only flows through the stage 111 to be charged up in parallel with the activated charging device 123. The stages 111 in series with this stage 111 to be charged up are not charged as long as the switch SW of the charging devices 123 in parallel with these stages 111 remains in the open state.

The current through the capacitors C1 and C2 of the charging device 123 in operation is equal to the current through the inductor L. The values of the capacitors C1 and C2 are high enough to transmit the current needed for imposing a virtually constant voltage across the terminals of the inductor L.

During this conduction time, the second diode D2 of the charging device 123 conducts and the first diode D1 is non-conducting. The fourth diode D4 is also non-conducting.

The current is therefore stored in the inductor L until it reaches a peak value, approximately equal to the voltage applied across the terminals of the inductor L when the voltage generator supplies energy, multiplied by the value of the conduction time and divided by the value of the inductor L. This formula considers that the current in the inductor is zero prior to each period of operation of the charging device 123.

The voltage generator 125 then imposes a zero voltage or does not impose any voltage across the terminals of the charging device 123 set in operation across the terminals of the stage 111 to be charged up.

The continuity of the current through the inductor L is ensured by the fifth diode D5 when the voltage generator 125 imposes a zero voltage or does not impose any voltage at the input of the transformer T.

The current through the inductor L decreases proportionally to the voltage applied across its terminals. The period of time during which the voltage is zero is designed to be sufficiently long for the current in the inductor to be canceled even when the voltage across the terminals of the stage is at a minimum, which voltage corresponds to that at the end of charging. For example, the voltage generator 125 imposes a zero voltage or does not impose any voltage at the input of the transformer T for a fixed period of time longer than the minimum time corresponding to the minimum voltage at the end of charging.

The polarity of the output voltage from the voltage generator 125 can subsequently be inverted: a negative voltage is applied between the terminals $v_+$ and $v_-$ of the voltage generator 125.

The current only flows through the stage 111 under charge.

The current through the capacitors C1 and C2 of the charging device in operation is equal to the current through the inductor L.

During this phase, the first diode D1 conducts, the second diode D2 is non-conducting. The third diode D3 is also non-conducting.

As was previously the case, energy is stored in the inductor L. The current through the inductor L increases proportionally to the voltage applied across its terminals until it reaches a peak value.

This peak value is approximately equal to the voltage applied across the terminals of the inductor L when the voltage generator 125 supplies energy, multiplied by the value of the conduction time and divided by the value of the inductor L. As in the previous case, this formula considers the current in the inductor to be zero prior to each period of operation of the charging device 123.

At this time, the voltage generator 125 does not impose any voltage across the terminals of the charging device 123 of the stage 111.

The continuity of the current through the inductor L is ensured by the fifth diode D5 when the voltage generator 125 imposes a zero voltage or does not impose any voltage at the input of the transformer T.

The current through the inductor L decreases proportionally to the voltage applied across its terminals. The time during which the voltage is zero is designed to be sufficiently long for the current in the inductor to be canceled even when the voltage across the terminals of the stage is at a minimum, which voltage corresponds to that at the end of charging. For example, the voltage generator 125 imposes a zero voltage or does not impose any voltage at the input of the transformer T for a fixed period of time longer than the minimum time corresponding to the minimum voltage at the end of charging.

It will therefore be understood that with the set of bidirectional converters 7 or the set of unidirectional converters 107, an effective and fast charge balancing between the modules 13,113 is implemented and, at the same time, a second function is fulfilled for supplying power to the low-voltage 12V system.

By virtue of the redundancy of the plurality of the converters 7,107, the supply of power to the low-voltage system notably supplying power to certain vital functions of an automobile vehicle is guaranteed, and in addition, the auxiliary battery 3,103 can be eliminated. A good level of availability and of safety for the supply of the auxiliaries of the vehicle is ensured.

Furthermore, the set of bidirectional converters 7 or the set of unidirectional converters 121 can furthermore perform a third function for charge balancing of the accumulator stages 11.

Lastly, the set of unidirectional converters 107 and 121 allows different orders of magnitude of power to be transferred and can be used at the same time.

For this reason, the first 107 and second 121 unidirectional converters are preferred to the bidirectional converters 7.

The invention claimed is:

1. An apparatus comprising a charge balancing system for a power battery, said charge balancing system comprising a predefined number of modules connected in series, each module comprising at least two accumulator stages, each accumulator stage comprising at least one accumulator, a plurality of isolated converters configured in parallel and connected to a predefined number of associated accumulator stages and to a low-voltage power system for supplying electrical auxiliaries of an automobile, said plurality of isolated converters comprising a plurality of first unidirectional converters, each of which is connected across terminals of a module and to said low-voltage supply system, and a plurality of second unidirectional converters each of which is connected to said low-voltage supply system and across said terminals of said accumulator stages of said module, and a control unit for said first unidirectional converters and for said second unidirectional converters, said control unit being configured for controlling at least a first converter in such a manner as to bring said predefined number of modules to a similar level of charge or discharge, for controlling a transfer of energy from said power battery to said low-voltage supply system via said first converters, and for controlling at least a second converter in such a manner as to bring said associated accumulator stages of a module to a similar level of charge or discharge.

2. The apparatus of claim 1, wherein said control unit for said converters is configured for controlling a transfer of energy in a first direction from said power battery to said low-voltage supply system via said first converters, and for controlling a transfer of energy in a second direction from said low-voltage supply system to said power battery via at least said second converter.

3. The apparatus of claim 2, wherein said control unit is further configured for controlling a first converter for transferring energy from a module in said first direction, defining a stage of said module to be charged, and controlling said second converter in parallel with said stage to be charged so as to transfer energy in said second direction in such a manner as to transfer energy of said module transferred to said first converter to said stage to be charged of said module via said second converter.

4. The apparatus of claim 1, wherein said controller is further configured for transferring energy from a module to said at least one stage of said module via said first converter and said second converter.

5. The apparatus of either of claim 1, wherein said controller is further configured for causing transfer of energy from a first module to a second module via said first and second converters.

6. The apparatus of claim 5, wherein said control unit is configured for controlling said first converter for transferring energy from said first module in said first direction to said first converter, defining at least a second module to be charged, and for controlling at least a second converter associated with said second module for transferring energy in said second direction in such a manner as to transfer energy of said first module transferred to said first converter to said second module via said second converter.

7. The apparatus of claim 1, wherein said second converter comprises a plurality of charging devices configured in parallel, each of which is associated with an accumulator stage in such a manner as to charge said associated accumulator stage.

8. The apparatus of claim 1, further comprising means for protecting against a short-circuit.

9. The apparatus of claim 8, wherein said means for protecting comprises a plurality of fuses between said converters and said power battery.

10. The apparatus of claim 9, wherein said fuses are at an output of said charging devices, on a power-battery side thereof.

11. The apparatus of claim 8, further comprising a plurality of diodes, each of which is connected in series with a corresponding converter on a low-voltage supply-system side thereof.

12. The apparatus of claim 8, further comprising a plurality of bidirectional switches, each of which is connected in series with a corresponding converter on a low-voltage supply-system side thereof.

13. The apparatus of claim 12, wherein each of said bidirectional switches comprises two transistors configured in opposition.

14. The apparatus of claim 8, further comprising a plurality of first unidirectional switches respectively connected in series with said first converters, at an output thereof, and a plurality of second unidirectional switches respectively connected in series with said second converters, at an input thereof.

* * * * *